May 16, 1967 — L. A. BOLAND — 3,319,998
SEAT BELT RETRACTOR
Filed Dec. 16, 1965 — 2 Sheets-Sheet 1

INVENTOR.
Leonard A. Boland
BY
Paul Fitzpatrick
ATTORNEY

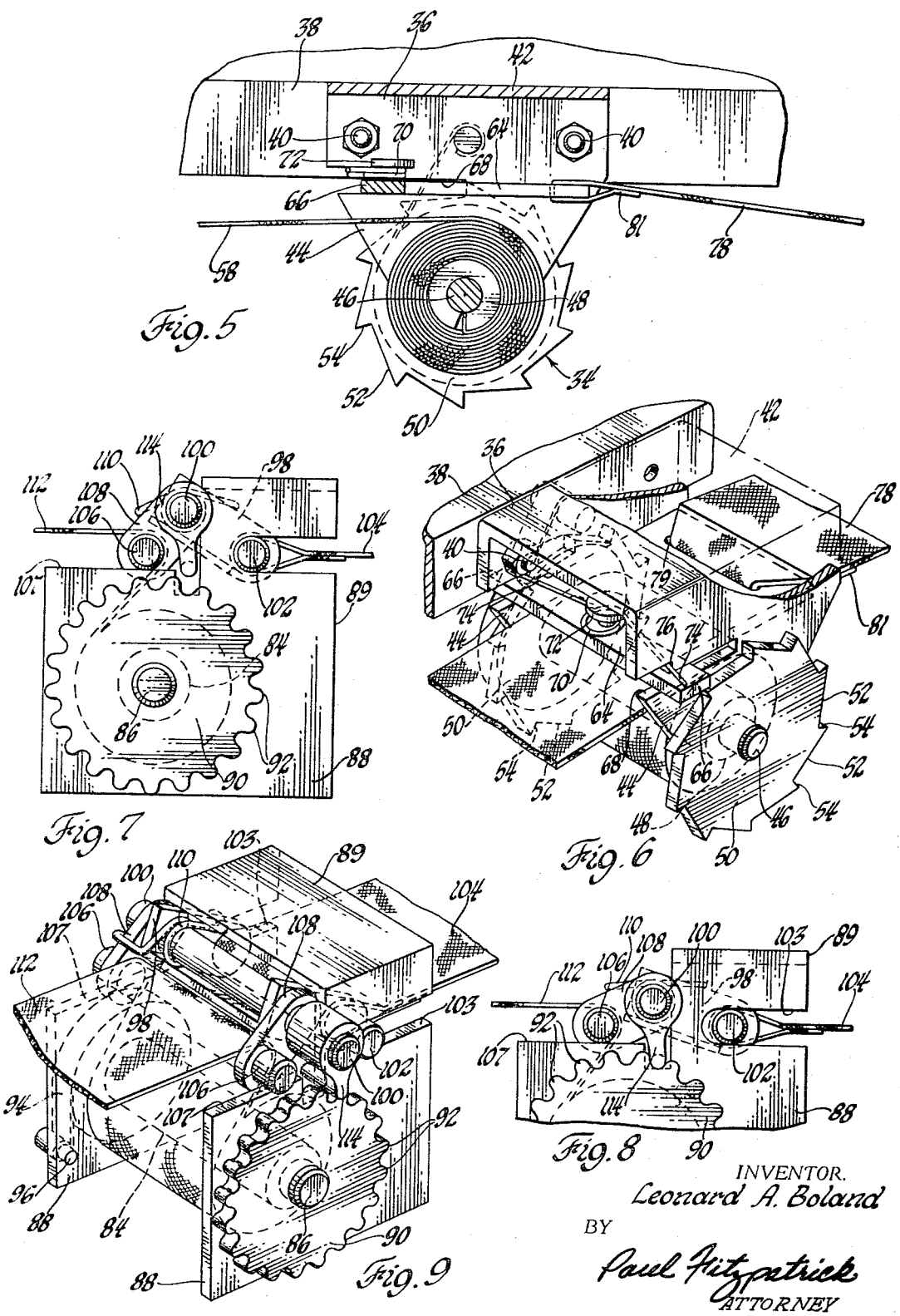

United States Patent Office 3,319,998
Patented May 16, 1967

3,319,998
SEAT BELT RETRACTOR
Leonard A. Boland, Warren, Mich., assignor to General Motors Corporation, Detroit, Mich., a corporation of Delaware
Filed Dec. 16, 1965, Ser. No. 514,305
4 Claims. (Cl. 297—388)

This invention relates to a safety device for mounting in a vehicle to restrain the movement of a body within the vehicle when the body is subjected to accelerated movements relative to the vehicle and, more particularly, it relates to a seat belt retractor locking mechanism.

The use of seat belts to restrain the movement of driver and passengers in vehicles has become increasingly more popular. The standard seat belt devices comprise a buckle and a lock plate each attached by a different section of belt to the floor of the vehicle on opposite sides of the seat. The lock plate is adapted to be inserted into the buckle mechanism to thereby secure the person within the seat of the vehicle. When not in use, the standard seat belt components create a problem as to storage as they are usually left lying upon the seat or are strewn on the floor of the vehicle. As a result, several types of retractor mechanisms have been introduced for the purpose of retracting and storing the seat belt members when not in use. These retractors frequently are of the floor-mounted type and also may be of the type that are installed at a location along the belt. Seat belt retractors present the serious problem of adjusting the belt to the size of the user. Hence, each time a different party uses the belt the retractor must be adjusted so that the belt fits securely around the user. Variations in the amount of clothing worn by a given user can also necessitate adjustment of the length of the belt. Hence, currently used retractors have solved the problem of storing the belt components when not in use but have not solved the problem of adjustment of the belts for different size users. Current retractors also frequently rely upon a locking mechanism in which sharp teeth dig into the belt thereby resulting in fraying and weakening of the belt.

It is, therefore, an object of this invention to provide a sealt belt retractor system which is automatically adjustable to various size users and which includes a locking feature which is actuated by the user when he places the locking plate within the buckle.

It is another object of the invention to provide a seat belt retractor system which automatically retracts both the buckle belt and the lock plate belt.

Other objects, features and advantages of the invention will become obvious upon reference to the succeeding detailed description of the invention and the drawings depicting the preferred embodiments of the invention, wherein:

FIGURE 5 is a sectional view taken in the plane of line 5—5 in FIGURE 4;

FIGURE 6 is a perspective view of the retractor mechanism of the FIGURES 1 through 5 embodiment;

FIGURE 7 is an end view of an alternative embodiment of the subject invention;

FIGURE 8 is a view of the mechanism of FIGURE 7 in locking position; and

FIGURE 9 is a perspective view of the retractor mechanism of the alternative embodiment as shown in FIGURES 7 and 8.

Initially, the discussion will be concentrated on the embodiment of the invention shown in FIGURES 1 through 6.

Figure 1:
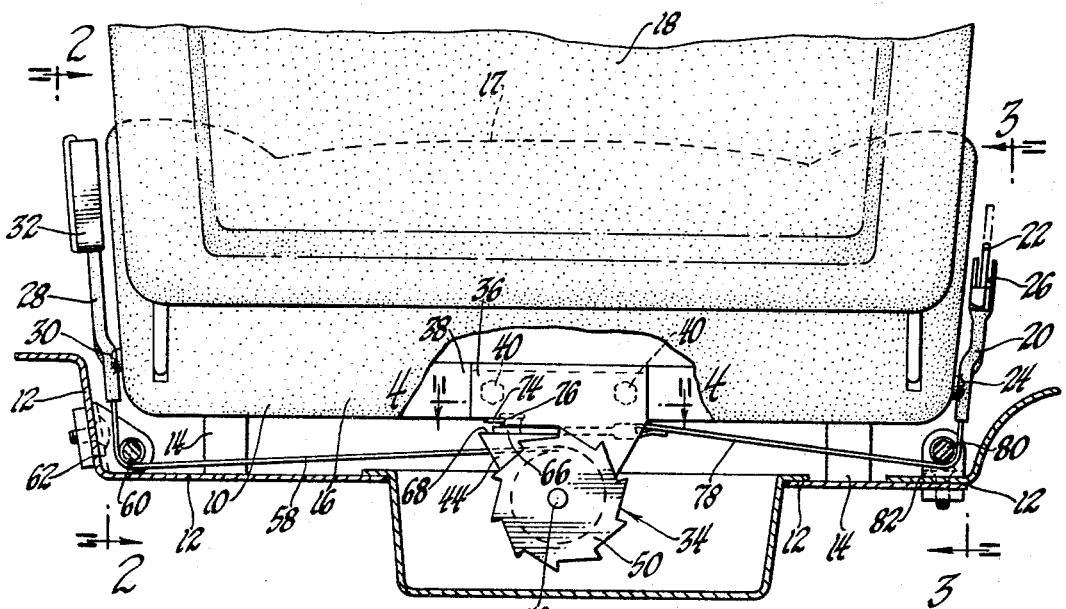
FIGURE 1 is an elevation view with parts broken away in section showing a preferred embodiment of the invention.
Figure 2:
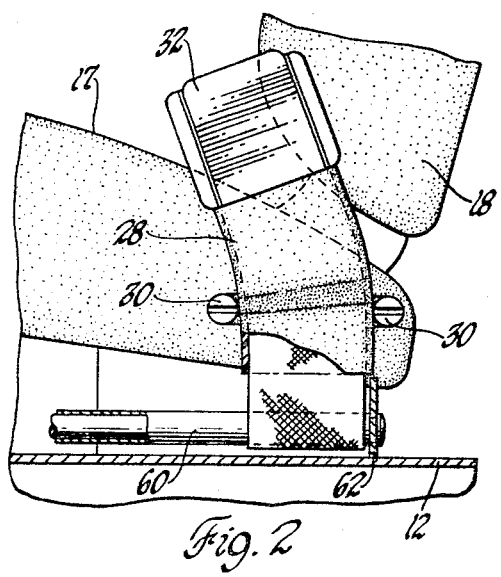
FIGURE 2 is an end view taken in the plane of line 2—2 in FIGURE 1.
Figure 3:
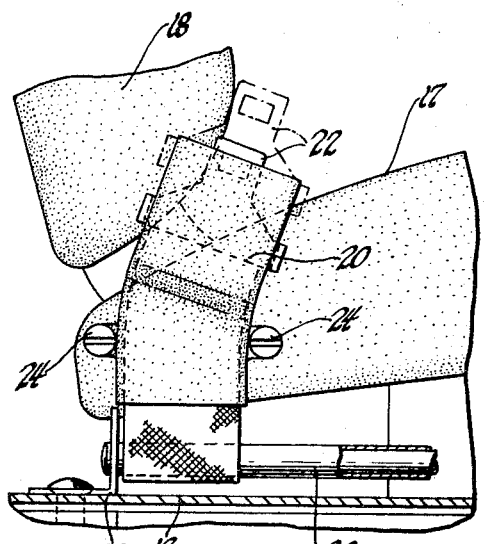
FIGURE 3 is an end view taken in the plane of line 3—3 in FIGURE 1.

FIGURE 1 shows the subject invention as used in conjunction with an automobile seat 10 which is mounted to the vehicle floor pan 12 by suitable means 14. The vehicle seat 10 may be of any suitable type having a base portion 16 with a supporting cushion 17 and a back supporting structure 18. It should be noted that the vehicle seat 10 is of the one-passenger or bucket variety.

Residing within a plastic sheath 20 on one side of the seat 10 is a lock plate 22. This plastic sheath 20 is mounted to the seat base 16 by screws 24 and includes an upper slot 26 to receive the lock plate 22. On the opposite side of the seat 10 a plastic sheath 28 is secured to the seat base 16 by screws 30 and provides a mounting means for a seat belt buckle 32. These sheath mountings for the lock plate 22 and the buckle 32 can best be seen in FIGURES 2 and 3. The lock plate 22 and the buckle 32 may be of any suitable coacting types which are adapted to be locked together by the insertion of the lock plate into the buckle and which may be unlocked by the user.

Figure 4:
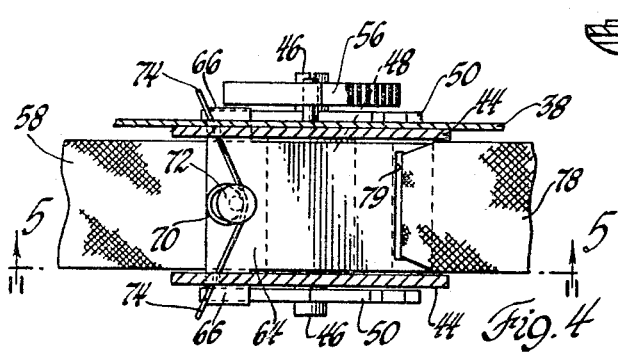
FIGURE 4 is a sectional view taken in the plane of line 4—4 in FIGURE 1.

A retractor assembly 34 is seen in FIGURE 1 to be attached to a frame 36. The frame 36 is attached to the vehicle seat frame 38 by means of bolts 40. This frame 36 has an upper portion 42 and a pair of triangular shaped side portions 44. This frame 36 is attached to the seat frame 38 at a location somewhat midway between the sides of the seat 10. The side portions 44 of the frame 36 rotatably mount a shaft 46. A reel 48 is fixed on the shaft 46 between the side portions 44. The reel 48 may be of any suitable type adapted to wind a belt. A pair of sprocket wheels 50 are fixed on the shaft 46 outside of the side portions 44. The sprocket wheels 50 include a number of ratchet teeth having back faces 52 and front faces 54. A flat, spiral clock spring 56 is seen in FIGURE 4 to be disposed generally coaxially relative to the reel 48 and is secured at one end to the shaft 46 externally of one sprocket wheel 50 and at the other end to the seat frame 38.

A belt 58 connects the buckle to the spool and is guided by roller 60 which is mounted on a bracket 62 secured to the floor pan 12. The clock spring 56 is wound such that its tendency is to rotate the spool in the clockwise direction, thereby retracting the belt 58 and winding it on the spool 48 to the position shown in FIGURE 1.

A slide bar 64 has a pair of ear portions 66 which slide in slots 68 in the side walls 44 of the retractor frame 36. This slide bar 64 has a spring 70 mounted on it by a stud 72 which passes through an eye in the spring 70. The spring 70 has leg portions 74 which extend outwardly and fit in recesses 76 in the side walls 44 of the retractor frame 36. Spring 70 resists movement of the slide bar 64 into the slots 68 within the frame 36. A belt 78 is secured to the opposite end of the slide bar by passing it through an aperture 79 in the slide bar and then sewing it together at 81. This belt 78 extends around a roller 80 and connects to the lock plate 22. The roller 80 is mounted on bracket 82 which is secured to the floor pan 12.

Hence, the belt 78 connects the lock plate 22 to the slide bar 64. The ears 66 on the slide bar 64 are of such a length that they are adapted to interfere with both the back faces 52 and the front faces 54 of the teeth on the sprockets 50 when the slide bar has been slid within the grooves 68 in the side portions 44 of the frame 36. Thus, it can be seen that movement of the lock plate 22 results in a movement of the slide bar 64 such that the ear portions 66 interfere with the rotation of the sprockets 50, thereby prohibiting both the paying out of the belt 58 to the buckle 32 and the transmission of the retractive spring force to the user.

The operation of this invention should become clear on consideration of the following:

The system is in its resting or non-use position as shown in FIGURE 1. At this point the lock plate is resting in the sheath 26 and the slide bar 64 is not interfering with the rotation of the sprocket wheels 50. The buckle 32 is resting on the sheath 28 such that its belt 58 is fully retracted onto the reel 48. Once the user is positioned in the seat 10 he pulls the buckle 32 across his body thereby unwinding a certain length of the belt 58 from the retracting reel 48. The buckle 32 is held adjacent to the lock plate 22. The lock plate 22 is then withdrawn from the sheath 26 and inserted into the buckle 32 thereby fastening the seat belt around the user. The withdrawal of the lock plate 22 from the sheath 26 results in the sliding of the slide bar 64 and the ears 66 which interfere with and prevent the rotation of the sprockets 50, thereby locking the reel 48 against further rotation. Hence, the seat belt assembly is secured around the user with exactly the right amount of belt withdrawn from the retractor and is locked in this position against further extension or retraction. This locking then secures the user in place and isolates him from any effects of the retractive spring force on the reel and belt. Hence, the invention uses the movement of the lock plate and its belt to result in a locking against any further movement of the buckle and its belt. In order to release the seat belt assembly, the user releases the lock plate from the buckle thereby allowing the lock plate to retract into the sheath 26 under the action of the torsion spring 70 which concurrently moves the slide bar out of engagement with the sprockets 50 thereby resulting in the retraction of the belt 58 onto the reel 48 and the subsequent withdrawal of the buckle 32 to its resting position on the sheath 28. The assembly is now in its retracted position and may be re-used according to the procedure discussed above.

An alternative embodiment of the locking means as taught by this invention is shown in FIGURES 7 through 9. This embodiment includes a reel 84 mounted on a shaft 86. The shaft 86 is mounted between a pair of side walls 88 of a frame 89. A sprocket wheel 90 is mounted on the shaft 86 externally of one side wall 88 and includes a plurality of uniform teeth 92 around its periphery. A clock spring 94 is secured to the shaft 86 at its opposite end from the sprocket wheel and secured to a pin 96 fastened to the exterior of the other side wall 88. This spring 94 tends to resist counterclockwise (as seen in FIGURE 7) rotation of the shaft 86 and the spool 84 and encourages clockwise (retraction) rotation. The locking linkage of this embodiment includes a U-shaped link 98 having pins 100 and 102 passing through the opposite ends thereof. Pin 102 resides in a pair of slots 103 in the side walls 88 of the frame 89. A belt 104 extending to the lock plate 22 is wrapped around the pin 102 and sewn to itself as in the previous embodiment.

A third pin 106 is connected to the pin 100 by means of a pair of links 108. This third pin 106 resides on the upper surface 107 of the side walls 88. A torsion spring 110 is wrapped around pin 100 and attached to the connecting links 108 and 98 and resists relative movement of these links. This spring 110 holds the links in the position shown in FIGURE 7 when the belt is in the retracted and non-buckle position. A belt 112 is connected to the buckle 32 and passes over the pin 106 before being wrapped around the reel 84.

The operation of the locking retractor of this embodiment is as follows:

When the lock plate is inserted into the buckle, after the buckle has been pulled across the body of the user, the pin 102 moves to the right (as seen in FIGURES 7 and 8), pin 106 moves to the left, and pin 100 moves downwardly. These movements are against the action of the torsion spring 110. The belt 112 then becomes pinched between the pin 106 and the U-shaped link 98. This pinching action prevents the belt 112 from any further extension. A J-shaped dog 114 is attached to the pin 100 externally of the links 98 and 108 and extends downwardly between the teeth 92 of the sprocket 90 as pin 100 moves downwardly, thereby preventing the rotation of the sprocket 90 and locking the belt against retraction onto the reel 84. This then locks the seat belt assembly against further extension or retraction until it is released. Upon the release of the lock plate from the buckle the torsion spring 110 returns the pins to the position shown in FIGURE 7, thereby releasing the belt 112 and removing the dog 114 from the sprocket 90 and allowing the clock spring 94 to rotate the reel 84, so as to retract the belt 112 onto the reel 84.

Hence, it can be seen that the subject invention provides a seat belt assembly wherein both the buckle and lock plate belts are retracted to a storage position when not in use, thereby eliminating the disadvantages of having them on the seat or the floor of the vehicle. It further provides a seat belt assembly which is automatically adjustable to various size users and which locks in place once the lock plate has been attached to the buckle. This thereby eliminates the need for any adjusting of the seat belt to various size users. It additionally provides a seat belt locking retractor which secures the user to the vehicle seat and which also isolates him from the retractive spring forces on the belt. It should also be noted that the invention provides a locking means which does not dig into and fray the belt thereby decreasing its strength.

Although but two embodiments of the subject invention have been shown and described in detail, it should be clear to those skilled in the art to which the invention pertains that many changes and modifications may be made thereto without departing from the scope of the invention.

I claim:

1. A locking retractor for first and second safety belts which are adapted to be separably connected to each other at their one end and secured to the locking retractor at their other end, said locking retractor comprising:
   a rotatable reel adapted to receive the other end of the first of said belts;
   a first spring adapted to resist movement of said reel in one direction of rotation and encourage movement of said reel in the other direction of rotation;
   sprocket means attached to and rotatable with said reel;
   locking means attached to the other end of the second of said belts and movable with said second belt into contact with said sprocket means to thereby prevent rotation of said reel;
   and a second spring adapted to bias said locking means out of locking contact with said sprocket means when said locking means is not being actuated by said second belt.

2. A locking retractor for first and second safety belts as set forth in claim 1, wherein said first belt is considerably longer than said second belt and is wound on said reel under the retraction force of said first spring.

3. A locking retractor for first and second safety belts as set forth in claim 2, wherein said locking means includes a T-shaped bar having a central length attached to said second belt and a pair of ear portions adapted to interfere with said sprocket means to prevent rotation of said reel.

4. A locking retractor for first and second safety belts as set forth in claim 1, wherein said locking means includes first and second pins each connected to a third pin by connecting links, said first pin being fixed to said second belt, said first belt passing over said second pin prior to being wound on said reel, said second spring resisting the movement of said first and second pins relative to said third pin, an extension from said third pin movable into locking interference with said sprocket means, movement of said second belt resulting in movement of said first and third pins thereby moving said extension.

References Cited by the Examiner

UNITED STATES PATENTS

| | | | |
|---|---|---|---|
| 2,964,135 | 12/1960 | Sand | 188—69 |
| 3,125,374 | 3/1964 | Bissell | 297—388 |
| 3,147,996 | 9/1964 | Ferrara et al. | 297—388 |
| 3,171,688 | 3/1965 | Nichalos | 297—388 |
| 3,248,148 | 4/1966 | Board et al. | 297—388 |

CASMIR A. NUNBERG, *Primary Examiner.*